United States Patent [19]

Jezl

[11] 4,189,458
[45] Feb. 19, 1980

[54] METHOD FOR CONVERTING POLYMER POWDER TO PELLETS

[75] Inventor: James L. Jezl, St. Charles, Ill.

[73] Assignee: Standard Oil Company a corporation of Indiana, Chicago, Ill.

[21] Appl. No.: 865,402

[22] Filed: Dec. 29, 1977

Related U.S. Application Data

[63] Continuation-in-part of Ser. No. 752,514, Dec. 20, 1976, abandoned.

[51] Int. Cl.$^2$ ............................................. B02C 18/00
[52] U.S. Cl. ................................................... 264/143
[58] Field of Search ............... 264/140, 141, 142, 143, 264/144

[56] References Cited

U.S. PATENT DOCUMENTS

| 3,607,999 | 9/1971 | Corbett | 264/144 |
| 3,984,603 | 10/1976 | Zechinati | 264/144 |
| 4,057,607 | 11/1977 | Soehngen | 264/141 |

Primary Examiner—Robert F. White
Assistant Examiner—James R. Hall
Attorney, Agent, or Firm—Wallace L. Oliver; Arthur G. Gilkes; William T. McClain

[57] ABSTRACT

Thermoplastic polymer particles are converted to pellets by depositing the powder onto a moving platform, melting the particles and transferring the melted polymer to a pelletizer.

5 Claims, 3 Drawing Figures

METHOD FOR CONVERTING POLYMER POWDER TO PELLETS

CROSS-REFERENCE TO RELATED APPLICATION

This is a continuation-in-part of application Ser. No.752,514 filed Dec. 20, 1976 now abandoned.

BACKGROUND OF THE INVENTION

In the commercial manufacture of thermoplastic polymers, frequently polymer is formed as particles, such as a powder, which must be converted to salable pellets by melting the powder in a batch or continuous mixing device by mechanical shear and auxiliary heating, and passing such molten material to a pelletizer. In such process, the mechanical shear melting step is energy intensive and represents an overall low energy utilization efficiency. A method to decrease the energy use in the melting step would be advantageous for the industry.

SUMMARY OF THE INVENTION

This invention comprises (a) depositing thermoplastic polymer particles onto moving, continuous platform, one or more zones of which are heated to above the melting temperature of such polymer, (b) melting the polymer in such zones and (c) transferring the melted polymer from the moving platform to a pelletizer.

BRIEF DESCRIPTION OF THE INVENTION

Figure 1:
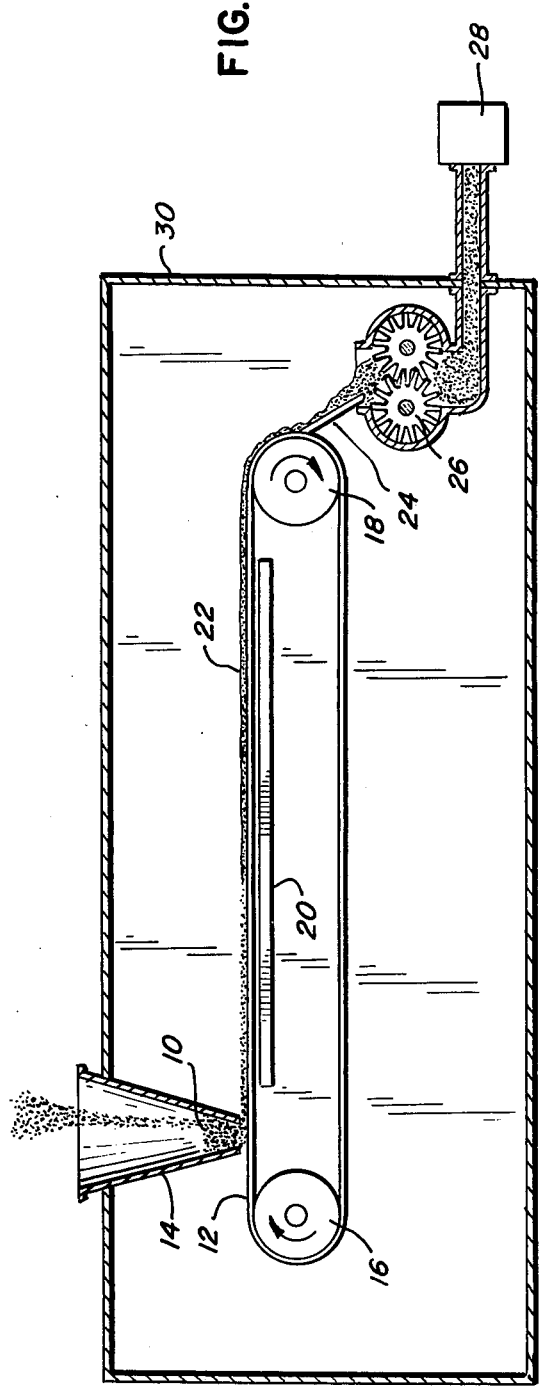
FIG. 1 shows a moving platform onto which polymer particles are deposited, melted by a heated plate, and transferred to a pelletizer.

In this invention thermoplastic polymer particles are deposited onto a moving, continuous platform, melted by a heating means and transferred to a pelletizing unit. The polymer particles, which can contain additives, antioxidants, colorants and the like, are deposited onto the moving platform in a generally uniform layer thin enough to be melted conveniently by the heating means used. Typically, the polymer particle layer is about one-tenth to several inches thick depending on the capacity of the unit. Generally, the polymer particles are deposited onto the platform by conventional means such as through a hopper fed and metered by a screw conveyor. The specific means is not critical to this invention so long as the polymer particles are deposited in a substantially uniform layer.

The platform should move at a generally uniform rate which is determined so as to allow the polymer powder to melt before it is transported to the pelletizer. The exact rate can be determined from the melting temperature of the polymer and the capacity of the heating unit. Typically, the lower the capacity of such heating unit, the slower must be the speed of the platform.

The moving, continuous platform useful in this invention should be sufficiently chemically resistant and mechanically strong to withstand the temperature and environment employed. In addition, if the moving platform is a continuous belt, it must be flexible. If the heating means is positioned below the platform, such platform should be heat conducting. A preferred platform is constructed from stainless steel.

The heating means useful in this invention can be a heated plate situated below the moving platform or heating elements positioned above the platform. Typically, an electrically heated plate is situated below the platform, although the platform itself can have heating elements imbedded in it. The heating means should be sufficient to melt the specific polymer used.

The molten polymer is transferred by appropriate means to a pelletizer. Typically, if the platform is a contiuous belt, a doctor blade is mounted such that it scrapes the molten polymer from the belt into an inlet of a gear pump which feeds a pelletizer. If the platform is a revolving turntable, the polymer melt can be forced to the edge of such turntable and into a gear pump by means of stationary guide bars mounted above the turntable. Alternatively, a moving arm can transfer polymer melt to the inlet of a gear pump.

Since molten polymer usually is oxidized easily, the moving platform should be enclosed and an inert atmosphere maintained within.

The thermoplastic polymers which can be used in this invention include polyethylene, polypropylene, copolymers thereof, polyesters, and copolymers of polyethylene or polypropylene with terminal olefins having less than eight carbon atoms including alpha-olefins and dienes. The most useful polymers are polyethylene, polypropylene and copolymers thereof. Examples of polymerization techniques in which polymer powders are formed include slurry and vapor phase processes. In a slurry polymerization, polymer is formed as a particle in a liquid hydrocarbon such as hexane or heptane. After removal of such liquid hydrocarbon, the polymer is recovered as a powder. In a vapor phase polymerization such as that described in U.S. Pat. Nos. 3,957,448 and 3,965,083, incorporated by reference herein, polymer powder can be withdrawn from the main reactor chamber and used in this invention.

Typically, polymer particles useful in this invention are in the form of a powder with particle sizes ranging from about 350 to 16 mesh. However, the size of the particles is not critical and can range up to any convenient size so long as they can be melted on the platform. The melted polymer is converted to pellets by a conventional pelletizer. Typically, polymer melt is forced through a stranding die, cooled and solidified by water, and chopped into pellets by knife blades. The resulting pellets can be of any convenient size for bagging and transportation and usually are about four millimeters in diameter.

Generally, after the polymer particles deposited on the platform are heated above the melting temperature of the polymer, the molten material is transferred from the platform to a conventional pelletizer. In one preferred embodiment particles are deposited onto a moving, continuous stainless steel belt and are passed over a heated plate where the polymer melts. The molten mass, at a temperature of about 400°–600° F. depending upon the polymer, is scraped from the belt by a doctor blade and is dropped into the inlet of a gear pump which feeds a stranding die and chopper of a pelletizer. In another similar embodiment, the thermoplastic polymer is melted by heat lamps or heating elements positioned above the moving belt.

In another embodiment of this invention, polymer particles are deposited onto one segment of a moving platform comprising a revolving turntable. The particles are transported through a heated zone where they melt and then retained by guide bars as the polymer melt is transferred to a pelletizer.

This invention can be understood further by reference to the Figures.

In FIG. 1 polymer powder 10 is deposited through hopper 14 onto a continuous belt 12 which is moved by rollers 16 and 18. The polymer powder is transported over a heated plate 20 maintained at a temperature of about 500° to 600° F. whereupon the polymer is transformed into a molten material 22. As the molten polymer passes over the end of the moving belt, the polymer is scraped by doctor blade 24 into the inlet of gear pump 26 which drives the molten polymer into pelletizer 28. The entire apparatus is surrounded by an enclosure 30.

Figure 2:
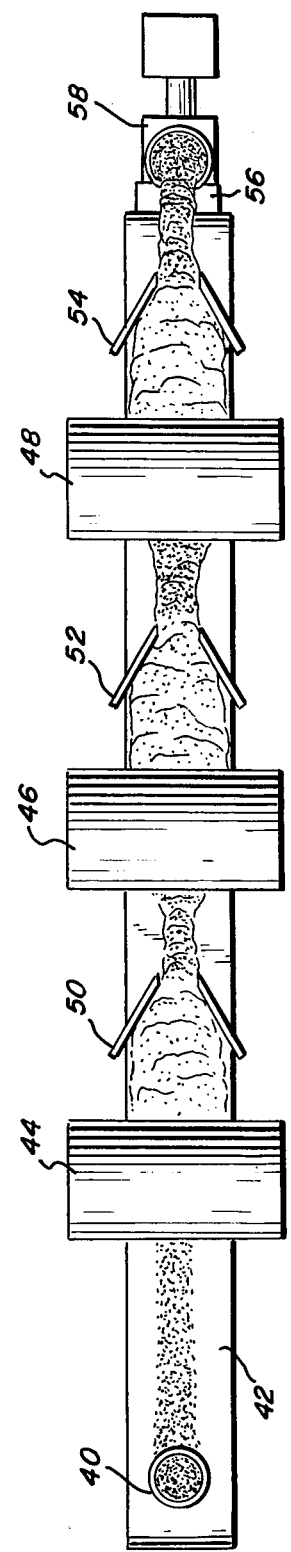
FIG. 2 shows polymer melted by heat pressure rollers.

In FIG. 2 polymer powder is deposited from a hopper 40 onto a moving belt 42 and is melted as it passes between a heated plate and heated pressure rollers 44, 46, and 48. After the polymer passes through each roller, pairs of guide bars 50, 52, and 54 retain the polymer in the center of the belt. The molten polymer is transferred to a gear pump 58 by doctor blade 56.

Figure 3:
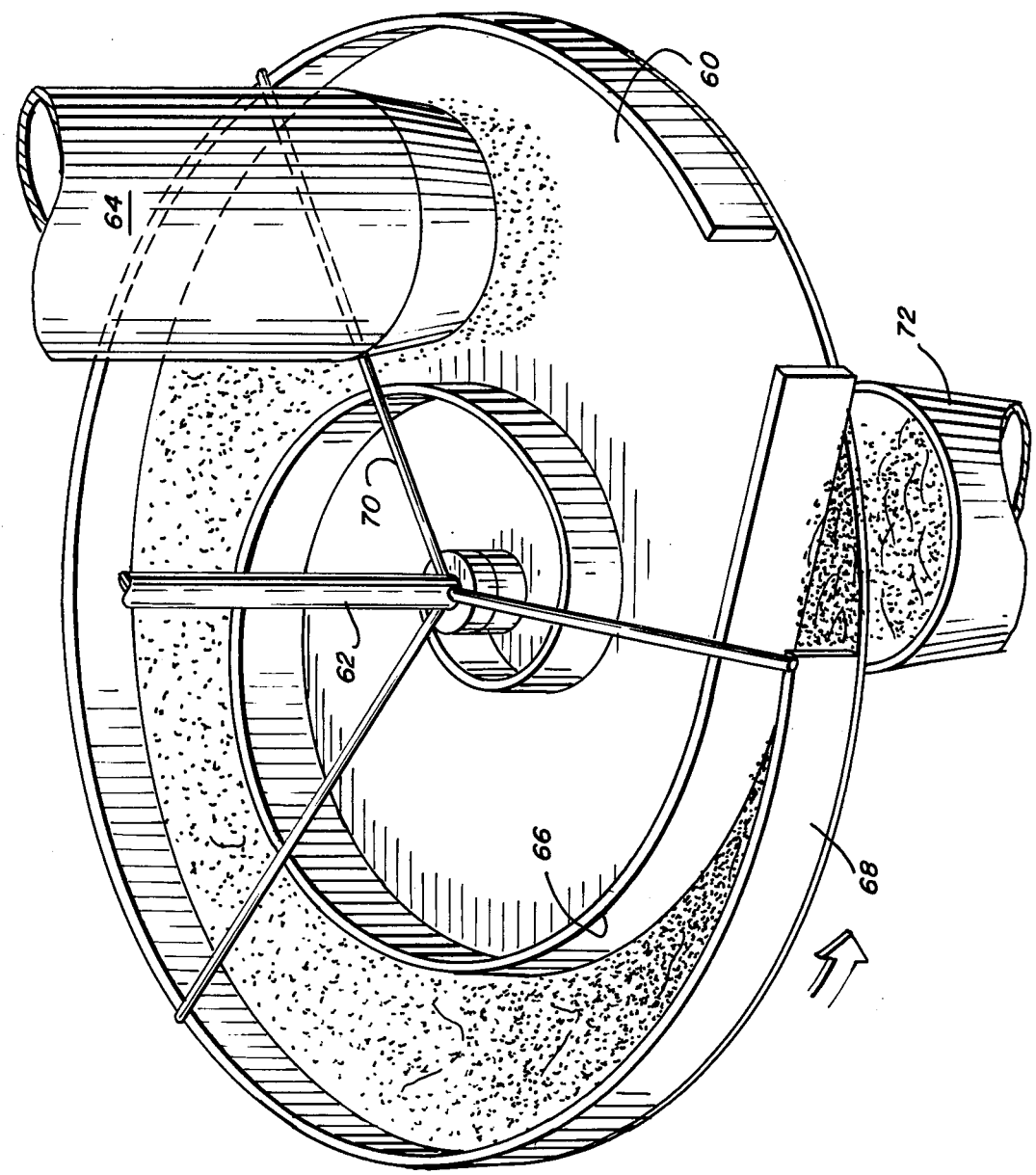
FIG. 3 shows a moving platform, in the form of a turntable, onto which polymer particles are deposited, melted, and transferred to a pelletizer.

FIG. 3 shows an embodiment of this invention in which polymer particles are deposited through hopper 64 onto a revolving circular platform 60 driven by shaft 62. The polymer is heated either by heating elements imbedded within the platform or by a separate heated plate positioned below the platform. The polymer is restrained by stationary guide bars 66 and 68 and is transported by the moving platform to the inlet 72 of a gear pump (not shown) which feeds a pelletizer.

In one specific illustration, ethylene polymer powder from a 50 million pound per year polymerization unit is deposited as a one-inch layer onto a three foot by 40 foot stainless steel belt as shown in FIG. 1 moving at 4 to 10 feet per minute. The polymer is melted by an electrically heated plate positioned below the belt. The molten mass, at a temperature of 400°–600° F., is scraped from the end of the belt and drops into the inlet of a gear pump which feeds a stranding die and chopper of a pelletizer.

The use of this invention is advantageous in avoiding trapped volatile material within the pelletized polymer. In a conventional extrusion melting process, volatile material, such as odorants, are constrained with the extruder. In this invention volatile matter is removed easily as the polymer is heated on the platform. Therefore, the resulting polymer pellets contain less volatile contaminants. Another advantage of this invention is the ease at which polymer additives such as antioxidants, colorants, fire retardants and the like can be added to the polymer powder before melting.

I claim:

1. A method to convert thermoplastic polymer particles into pellets comprising:
   (a) depositing thermoplastic polymer particles onto a continuous platform moving at a generally uniform rate;
   (b) heating the polymer particles above the melting temperature of such polymer;
   (c) transferring melted polymer without substantial cooling from the moving platform to a gear pump which feeds a thermoplastic polymer pelletizer wherein molten polymer is stranded, cooled and chopped into pellets.

2. The method of claim 1 wherein the moving platform is a flexible continuous belt.

3. The method of claim 1 wherein the moving platform is a revolving turntable.

4. The method of claim 1 wherein the polymer is selected from the group consisting of polyethylene, polypropylene and copolymers of ethylene and propylene.

5. The method of claim 4 wherein the particles have a size between about 350 and 16 mesh.

* * * * *